United States Patent Office 3,278,512
Patented Oct. 11, 1966

3,278,512
MANUFACTURE OF SYNDIOTACTIC POLYMERS OF ALPHA-OLEFINS IN THE PRESENCE OF LiAl(R)x(H)y, TRANSITION METAL HALIDE AND A PHOSPHINE, ARSINE OR STIBINE
Donald D. Emrick, Maple Heights, and Roman Zorska, Cleveland, Ohio, assignors to The Standard Oil Company, Cleveland, Ohio, a corporation of Ohio
No Drawing. Filed Apr. 11, 1963, Ser. No. 272,225
6 Claims. (Cl. 260—93.7)

The present invention relates to an improved process for producing syndiotactive poly-alpha-olefins such as polypropylene and polybutene and to a novel catalyst useful in this process, said catalyst being composed of a lithium aluminum alkyl hydride, a titanium tetrahalide and a hydrocarbon phosphine.

G. Natta, et al., in Journal of the American Chemical Society, 84, 1488–1490 (1962) reported obtaining small yields of partially crystalline, partially syndiotactic polypropylene by use of $VCl_4 \cdot C_6H_5OCH_3 \cdot 5R_2AlCl$ catalyst by operating for 20 hours at $-78°$ C. in toluene or n-heptane solvents. It was also reported that such vanadium systems were sterospecific in the polymerization of propylene to a syndiotactic polymer only if operations were conducted below 0° C. and preferably between $-30$ and $-100°$ C. In contrast, the instant process produces much higher yields of syndiotactic containing block polymer in which at least 50 percent of the total crystallinity occurs as syndiotactic polypropylene. Unlike Natta's preferred technique, the instant process is effective at below room temperature or above ($-40$ to $+60°$ C.) and generally produces more and better syndiotactic block polymers. For a given amount of transition metal content, the instant catalyst produces polypropylene, for instance, up to 6 to 30 times as rapidly at room temperature at propylene partial pressures of less than 1 atmosphere than Natta's system at $-78°$ C.

Natta also reported in Rend. Accad. Nazl. Lincei, 28, 539–544 (1960) the preparation of similar syndiotactic products contaminated with varying amounts of isotactic polymers by using violet $TiCl_3$-$(C_2H_5)_2AlX$ or $LiC_4H_9$-n catalyst and $TiCl_4$-$LiC_4H_9$-n catalysts at low temperatures. Natta reported 1% syndiotactic polypropylene was obtained with a $TiCl_3$-$(C_2H_5)_2AlF$ or $LiC_4H_9$-n catalyst. The relative quantity of syndiotactic polymer as compared with the total yield of polymer increased with the decreasing polymerization temperature and was more or less absent in polymers where experimental temperatures were above 70° C.

U.S. Patent No. 2,973,348 describes the use of alkali metal-aluminum tetraalkyl-transition metal halide-organophosphite or phosphate or phosphoric triamide catalyst and the process of using them for producing polymers of propylene. A typical example utilizes a sodium aluminum tetraethyl-titanium tetrachloride-hexadimethyl phosphoric triamide catalyst with propylene at 55° C. and 30 p.s.i. for 6 hours. The polymer formed was hard, crystalline, conventional isotactic polymer.

A similar catalyst system for the polymerization of propylene appears in U.S. Patent No. 3,058,969. The catalyst disclosed in this patent is composed of an alkali or an alkaline earth metal hydride, titanium tetrachloride and triphenyl phosphine or a trialkyl phosphine, the mole ratio of the first component to the third component being 1:1 to 1:0.25. A typical example utilizes a mixture of lithium aluminum hydride, titanium tetrachloride and triphenyl phosphine. This process produces polymer containing primarily isotactic stereoregularity. An experiment run with the catalyst disclosed in this patent at 80° C. produced a polymer which contained only about 20% of its total crystallinity as syndiotactic crystallinity.

The use of lithium aluminum tetraalkyl-titanium tetrachloride catalyst system for producing linear polyethylene is known and disclosed in "Preparative Methods of Polymer Chemistry" by Wayne R. Sorenson and T. W. Campbell, 1961. It has been found that the use of a $$TiCl_4LiAl(C_{10}H_{21})_4$$

catalyst at ambient temperatures in the polymerization of propylene a polymer was produced which gave a weak X-ray reflection at a lattice distance of 7.2 A., characteristic of syndiotacticity; however, the main and more intense reflections were largely due to conventional isotacticity. The crude polymer contained considerable amorphous or non-crystalline atactic material, the crude material being only 14 to 15 percent crystalline by X-ray analysis.

Canadian Patent No. 627,353 discloses a polymerization process utilizing a catalyst of an alkali metal aluminum tetraalkyl-titanium or vanadium tetrahalide and a phenyl or alkyl phosphine. The process was carried out in a temperature range of 0 to 250° C. and preferably 50 to 150° C. The catalyst of the Canadian patent differs from the catalyst of the instant invention in that the catalyst of the present invention utilizes a lithium aluminum alkyl hydride. The polypropylene obtained by the process of the Canadian patent at low temperatures contains at most only 50–72% of the over-all syndiotactic crystallinity obtained by the process of the present invention.

It is an object of the present invention to provide a process for preparing highly syndiotactic, crystalline polymers of alpha-olefins. Another object is the provision of a catalyst for producing crystalline, highly syndiotactic poly-alpha-olens. That these and other objects have been accomplished by the present invention will become apparent to those skilled in the art from the following description and illustrative examples.

The catalyst of the invention is composed of (1) a lithium aluminum trialkyl monohydride, a lithium aluminum dialkyl dihydride, a lithium aluminum alkyl trihydride or a mixture of these represented by the formula $LiAl(R)_x(H)_y$ wherein R is an alkyl group having from 1 to 20 carbon atoms, $x$ and $y$ are numerical values greater than zero, preferably $y$ is at least 1, and the sum of $x+y$ is always 4; (2) a titanium or a vanadium tetrahalide wherein the halide may be chlorine, bromine or iodine represented by the formula $MX_4$ wherein M is a member selected from the group consisting of titanium and vanadium and X is a member of the group consisting of chlorine, bromine and iodine; and (3) an organic phosphine, arsine or stibine represented by the formula $AR'_3$ wherein A is a member of the group consisting of phosphorous, arsenic and antimony and R' is a hydrocarbon radical having from 1 to 8 carbon atoms.

A certain minimum number of carbon atoms in the alkyl group or groups of the lithium aluminum alkyl hydride are preferred. It is estimated that a minimum of about 12 to 18 carbons per lithium aluminum alkyl hydride should be present, the postulated maximum number being smaller for systems operating in an aromatic solvent medium than in a saturated hydrocarbon medium. For practical reasons, the maximum number of carbon atoms will usually be about 35–40.

Primarily for economic and practical reasons, the molar ratios of lithium aluminum alkyl hydride to titanium to phosphorus should preferably fall within the range of about 0.6 to 4 lithium aluminum to titanium, and 0.2 to 2.0 phosphorus to titanium.

The solvent used in the polymerization process of this invention may be a paraffinic or aromatic solvent such as cyclohexane, tetralin, toluene, etc.

In preparing the lithium aluminum alkyl hydride component of the catalyst of this invention, a solvent such as tetralin is freshly distilled over sodium and stored over sodium under nitrogen to remove traces of moisture and oxygen. A liquid alpha-olefin such as decene-1 or nonene-1 is treated with solid sodium hydroxide for 48 hours and distilled over sodium. Lithium aluminum hydride is then crushed with minimum exposure to air and moisture.

The tetralin and decene-1 or nonene-1 are placed in a nitrogen-flushed flask equipped with condenser, stirrer, and gas inlet tube. An excess of lithium aluminum hydride and glass beads are added under nitrogen and the mixture is heated cautiously with stirring to 120° to 140° C. until an exotherm has passed. Heating is continued at 180° to 190° C. for two hours during which time hydrogen is evolved with a reduced foaming tendency. Upon cooling, the mixture is filtered under nitrogen through a dry celite layer into a nitrogen filled container.

To this reaction product in hydrocarbon solvent media are successively added titanium tetrachloride and the organic phosphine. The polymerization reaction is then carried out in this solvent-catalyst mixture.

The polymerization process of the present invention is carried out by adding to the catalyst an alpha-olefin containing from 3 to 10 carbon atoms at from 0.001 to 30 atmospheres of olefin partial pressure, at from −40 to +60° C. and preferably at a temperature above 0° C. The use of elevated olefin pressure may be employed to increase olefin concentration and the rate of polymerization. Usually olefin partial pressures of 1 to 10 atmospheres are preferable over pressures much in excess of 10 atmospheres. Aromatic, saturated aliphatic, or alicyclic solvent media may be utilized. As with all sensitive organo-metallic coordination olefin polymerization catalysts, oxygen, water and other highly polar materials must be rigidly excluded during the actual catalyst preparation and polymerization steps.

The crude polymers of this invention contain more than 50 percent of their crystallinity as syndiotactic polypropylene crystalline blocks or sequences in the structure of the polymer. The polymer may be precipitated and/or congealed and de-ashed by repeated washings with a low molecular weight aliphatic alcohol or ketone acidified with hydrogen chloride. The crude polymer may be fractionated into fractions of differing small crystallinity and relative crystallinity by such common techniques as solvent extraction, with ether, hexane, heptane or isooctane. The more crystalline fractions tend to be more insoluble. During the polymerization step hydrogen, a dialkyl zinc, alkyl zinc halide or dialkyl cadmium compound or other chain-regulating agent may be used for regulating the molecular weight.

The presence of syndiotactic or syndiotactic block crystalline structure in a polypropylene containing no smectic allotropic form is usually determined by intense reflections in the X-ray diffractogram at lattice distances of about 7.25 and 5.25 A. and a weaker reflection at a lattice distance of 3.6 A. as well as dichroic infrared absorption spectral band at 11.53 microns.

The syndiotactic polypropylenes prepared by the process of this invention are of an appreciable molecular weight and crystallinity, and are tough materials having high impact strength. The stiffness and yield tensile strength increases with increasing degree of crystallinity while an elastomeric character is mostly associated with those products of a lower degree of crystallinity. The polypropylenes of this invention are particularly useful in applications in which high elasticity or impact is required such as in packaging containers and the like as well as in other known applications for polypropylenes of the conventional isotactic type. The syndiotactic polypropylene of this invention can be vulcanized with various rubber systems; however, compared with atactic polypropylene it has better mechanical properties which can be noted particularly in the case of moderately vulcanized products. Compared with unsaturated rubbers, it has the advantage of higher resistance to aging.

As indicated earlier, unoriented smectic-free crystalline polypropylene of syndiotactic structural stereoregularity exhibits strong X-ray reflections corresponding to lattice distances of about 7.3 A. and 5.3 A.; whereas unoriented crystalline polypropylenes of isotactic structural stereoregularity exhibit, among others, strong reflections corresponding to 6.3 A. and 4.8 A. In the absence of orientation of the smectic allotropic form, reflections corresponding to these lattice distances were considered to be sufficiently strong, sufficiently independent, and sufficiently characteristic of normal syndiotactic and isotactic crystallinity to be of use in estimating the relative amounts of these stereo-isomers in a given polypropylene. The use of both the $d=5.3$ A. (corrected for the relative intensity occurring in isotactic crystalline polymer) and $d=7.3$ A. reflections rest largely on the published observations of Weidinger and Hermanns (Makromol. Chem. 50, 98–115, 1961). Because the relative intensity of individual crystalline polypropylene peaks fluctuate rather considerably from one sample to another for different relative degrees of tacticity, probably because of polymorphism, it is therefore believed that the utilization of several peaks to estimate the percent syndiotacticity would yield more satisfactory results. Addink and Bientema have observed that in oriented samples the reflection of $d=7.3$ A. relative to other crystalline peaks increases with decreasing overall crystallinity while the peak at $d=5.3$ A. increases in intensity with increase in crystallinity.

The following is a discussion of the method used in the estimation of relative syndiotacticity in polypropylenes. X-ray diffractograms were obtained on samples prepared by a casting, pressing technique as perfectly flat surfaces in a 10 mm. x 20 mm. x 1 mm. cavity of a Phillips X-ray specimen holder at or above the melting point of the polymer (165 to 200° C.) and then cooling to room temperature. A scintillation counter was used as the detector for the nickel-filtered copper K alpha-radiation. The resulting X-ray diffractograms were treated in the manner used by A. Weidinger and P. H. Hermanns, particularly with regard to the construction of the background curve, the procedure being essentially the same as that of Natta and his coworkers in G. Natta, P. Corradini and M. Cesari, Atti. Accad. Nazl. Lincei. Rend., 22, No. 1, 11–17 (1957). Briefly, the maximum of the background was taken to lie at the same angle of diffraction as that in the diffraction curve of an entirely amphorous sample. The background curve is then constructed. Only samples which were obviously free of or nearly free of the smectic allotropic modification or significant orientation were evaluated.

The appropriate Lorenz and polarization correction factors were multiplied by individual crystalline reflection surface areas represented by the designation I to obtain factors for the various significant reflections corresponding to lattice distances of about 7.3 A., 6.3 A., 5.3 A., 4.8 A. The correction factor for lattice distances of 7.3 A. was 2.15; for 6.3 A., 3.06; for 5.3 A., 5.18; and for 4.8 A., 6.98. For very highly or 100 percent syndiotactic polypropylene the following formula is derived:

$$\frac{2.15 I_{d=7.3A.} + 5.18 I_{d=5.3A.}}{2.15 I_{d=7.3A.} + 3.06 I_{d=6.3A.} + 5.18 I_{d=5.3A.} + 7.98 I_{d=4.8A.}} =$$
$$F_s = 1.00$$

From data for the most highly isotactic polymers available from various preparational procedures, it was decided to use the derived value of $F_s=0.186$ as the value of a hypothetical 100 percent isotactic polymers; and this value was used as a correction factor arising from the $d=5.3$ A. contribution of isotactic polypropylene which must be considered when 5.3 A. is used to determine the relative syndiotacticity.

Since:
$$\frac{2.15I_{d=7.3A.}+5.18I_{d=5.3A.}}{2.15I_{d=7.3A.}+3.06I_{d=6.3A.}+5.18I_{d=5.3A.}+6.98I_{d=4.18A.}}$$
$-0.186=F_s-0.186=0.84$ "100% syndiotatic polymer"
$F_s-0.186=0.814$ for "100% syndiotactic polymer"
Therefore:
$$\frac{\frac{2.15I_{d7.3A.}+5.18I_{d=5.3A.}}{2.15I_{d=7.3A.}+3.06I_{d=6.3A.}+5.18I_{d=5.3A.}+6.98I_{d=4.8A.}}}{0.184}$$
$0.186\times100=\frac{F_s-0.186}{0.814}\times100=$ percent syndiotactic crystallinity (approximately)

The higher the "$F_s$" number, the higher the syndiotacticity of the polymer.

*Estimation of crystallinity*

The following equation of Natta and co-workers was used for the estimation of crystallinity wherein $I_{cryst.}$ is the area of the crystalline peak in the X-ray diffractogram, $I_{amorph.}$ is the area of the amorphous halo in the X-ray diffractogram and K is taken to equal 0.9 according to Natta:

$$\text{Percent Cryst.}=\frac{I_{cryst.}}{I_{cryst.}+KI_{amorph.}}\times100$$

$$\text{Percent Cryst.}=\frac{100\times2.15I_{1=7.3}+3.06I_{d=6.3A.}+5.18I_{d=5.3A.}+6.89I_{d=4.8}+10.30I_{d4.2A.}}{2.15I_{d=7.3A.}+3.06I_{d=6.3A.}+5.18I_{d=5.3A.}+6.89I_{d=4.8A.}+10.30I_{d=4.2A.}+0.9(69)\text{Am}}$$

The catalyst and process of the present invention are further illustrated and distinguished from the prior art in the following examples. The molecular weight values given in the following examples are solution viscosity molecular weights determined in decalin at 135° C. using the equation of Chiang, Journal of Polymer Science, 28, 235–238 (1958).

*Example 1*

A three-necked 200 ml. capacity flask was fitted with a self-sealing rubber serum cap, a Claisen connecting tube, a reflux condenser, and means for adding gaseous pure nitrogen and pure propylene, as well as a gas exit bubbler at the top of the reflux condenser. In this and the succeeding examples, the stipulated amount of solvent was added to the reaction flask and the gas space of the flask was thoroughly flushed with pure nitrogen before adding the catalyst ingredients and later the pure propylene, precaution being observed to avoid contact with either oxygen or moisture. External cooling of the reaction flask was accomplished either by means of a compressed air jet or by means of a water bath.

A coordination catalyst which was composed of triphenyl phosphine, lithium aluminum tridecyl hydride and titanium tetrachloride was prepared by adding 14.0 mls. of 0.5 M $(C_6H_5)_3P$ in cyclohexane to a mixture of 7.0 mls. of 1.0 M $TiCl_4$ in cyclohexane and 41.8 mls. of 0.193 M $LiAl(C_{10}H_{21})_3H$ in tetralin to the reaction flask along with 1200 mls. of reagent grade cyclohexane under nitrogen. Gaseous C.P. propylene was bubbled into the reaction mixture at about room temperature for about 20 hours. Work-up of the product by treatment with concentrated hydrochloric acid acidified isopropanol (1:40 by volume), followed by washing and drying yielded 65.6 grams of dry polymer, the polymer was found to be about 24% crystalline and about 77% of the crystallinity being syndiotactic crystallinity (X-ray diffractogram derived $F_s-0.186=0.456$). The average molecular weight of this polymer was found to be 2,455,000.

In a repeat of the foregoing procedure, 29.2 grams of dry polymer were isolated after a reaction time of about 15 hours under ambient conditons. The product was about 24% crystaline and about 77% of the crystallinity was syndiotactic (X-ray diffractogram derived $F_s-0.186=0.629$)

The molecular weight of this product was 1,820,000.

A three-necked 5000 ml. capacity flask was fitted with stirrer, self-sealing rubber serum ampoule cap, a Claisen connecting tube, a reflux condenser, and means for adding gaseous pure nitrogen and pure propylene, as well as a gas exit bubbler at the top of the reflux condenser. The flask was cooled externally by means of a water-cooled bath. To the flask was added 3000 ml. of dry cyclohexane and then under a pure nitrogen asmosphere were successively added 190 mls. of 0.22 M $$LiAl(C_{10}H_{21})_3H$$

in tetralin, 3.84 mls. (0.0349 moles) of pure titanium tetrachloride, and 182 mls. of 0.192 M $(C_6H_5)_3P$ in toluene. Contact was established with gaseous C.P. propylene with stirring, and was continued at ambient temperature and pressure for 22 hours, the propylene absorption having stopped completely before the end of this interval. Isolation by the usual technique yielded 159.4 grams of dry polymer (about 4570 grams of polymer per mole of titanium). The crude polymer displayed an X-ray crystallinity of about 29% and an X-ray diffractogram $F_s-0.186=0.635$, corresponding to about 79% of the total crystallinity occurring as syndiotactic crystallinity.

In a similar manner, the system prepared from 3000 mls. of cyclohexane, 144 mls. of 0.22 M $LiAl(C_{10}H_{21})_3H$ in tetralin, 2.90 mls. (0.0263 moles) of pure $TiCl_4$, and 139 mls. of 0.19 M $(C_6H_5)_3P$ in toluene under a pure nitrogen atmosphere, followed by stirred contact with gaseous propylene for about 40 hours, at ambient temperature and pressure, led to the isolation of 132.5 grams of crude polymer. The crude polymer displayed an X-ray crystallinity of about 30% and an X-ray diffractogram derived $F_s-0.186=0.667$, corresponding to about 82% of the total crystallinity existing as syndiotactic crystallinity.

Similar results were obtained when butene-1 was used in place of propylene in the forgoing procedures. The poly-butene-1 products when oriented exhibited melting points several degrees higher than those obtained for oriented specimens of poly-butene-1 prepared with conventional Ziegler-Natta catalysts.

Polypropylene was prepared employing a titanium tetrachloride-lithium aluminum tetradecyl catalyst system which is outside the scope of the present invention. A three-necked 2000 ml. capacity flask was fitted with a self-sealing rubber serum cap, a Claisen connecting tube, a reflux condenser, and means for adding gaseous pure nitrogen and pure propylene, as well as a gas exit bubbler at the top of the reflux condenser. The stipulated amount of solvent was added to the reaction flask and the gas space of the flask was thoroughly flushed with pure nitrogen before adding the catalyst ingredients and later pure propylene, precautions being observed to avoid contact with either oxygen or moisture. A coordination catalyst was prepared by adding 48 mls. of 0.197 M lithium aluminum tetradecyl in tetralin to 11.0 mls. of 1.0 M titanium tetrachloride in cyclohexane previously diluted with 450 mls. of reagent-grade cyclohexane in the nitrogen-flushed reaction flask. A stream of gaseous C.P. propylene was then admitted, with stirring at ambient room temperature for a period of 10 hours. Work-up of the crude product by treatment with concentrated hydrochloric acid acidified isopropanol (1:40), followed by washing and drying yielded 62 grams of a somewhat tacky polymer. The polymer was found to be 55–87% insoluble in hot isooctane and had a high molecular weight. Using X-ray techniques described earlier, the crude polymer was found to be only about 15% crystalline and only about 31% of this crystallinity was due to syndiotactic crystallinity (X-ray diffractogram derived $F_s - 0.186 = 0.25$).

Using the same apparatus and procedure described above, a coordination catalyst which is outside the scope of this invention was prepared by adding 30.0 mls. of 0.215 M lithium aluminum tetradecyl in tetralin to a solution of 6.45 mls. of 1.0 M titanium tetrachloride in cyclohexane in 600 mls. of reagent grade cyclohexane followed by 12.9 mls. of 0.5 M triphenyl phosphine in cyclohexane under a pure $N_2$ atmosphere. Gaseous C.P. propylene was then fed to the flask, with stirring, for a period of 11 hours at ambient room temperature. Work-up of the product yielded 22.6 grams of a tough polymer. This crude polymer was 72% insoluble in hot isooctane. The crude product was about 27% crystalline and about 42% of this crystallinity was syndiotactic crystallinity (X-ray diffractogram derived $F_s - 0.186 = 0.341$). The molecular weight of this polymer was 1,870,000.

In another similar experiment, 12.9 mls. of 0.5 M triphenyl phosphine in cyclohexane, 6.45 mls. of 1.0 M titanium tetrachloride in cyclohexane and 34.5 mls. of 0.21 M lithium aluminum tetradecyl in tetralin in 600 mls. of reagent grade cyclohexane were reacted with C.P. propylene under ambient conditions for six hours to yield 16.7 grams of dry isolated polymer. This polymer was about 31% crystalline of which about 27% was syndiotactic crystallinity (X-ray diffractogram derived $F_s - 0.186 = 0.219$). The molecular weight of this polymer was found to be 2,660,000.

In another experiment which is outside the scope of the present invention polypropylene was prepared with a lithium aluminum hydride—titanium tetrachloride—triphenyl phosphine catalyst. Into a fifty milliliter capacity Erlenmeyer flask, constricted at its neck for ready sealing by means of a torch, were placed a polytetrafluoroethylene covered magnetic stirring bar, 3.46 grams of powdered triphenyl phosphine and 2.0 grams of powdered lithium aluminum hydride under pure nitrogen. After thorough mixing, 2.9 ml. (5.0 grams) of pure titanium tetrachloride were cautiously added, stirring being maintained so long as possible although the catalyst mixture quickly completely solidified to a purple mass. The small catalyst flask was sealed and placed underneath 350 ml. of dry cyclohexane contained in a 1000 ml. capacity Parr autoclave. Under pure nitrogen the flask and its contents were crushed under the cyclohexane. The autoclave was sealed and then about 500 ml. of liquid propylene were added. The contents of the autoclave were then heated to 80° C., with stirring, and held at this temperature for 4 hours. Work-up of the crude product in the usual way and thorough washing with hot isopropanol-hydrochloric acid yielded 170 grams of isolated glass-free polymer, about 50% of the polymer being insoluble in hot isooctane. The crude polymer had an X-ray crystallinity of about 30.5% and an X-ray diffractogram derived $F_s - 0.186 = 0.165$ which corresponds to about 20% of the total crystallinity occurring as syndiotactic crystallinity.

*Example II*

The procedures outlined in Example I were followed employing as catalyst a mixture of titanium tetrachloride, lithium aluminum didecyl dihydride and triphenyl phosphine. The catalyst was prepared from 37.2 ml. of 0.188 M $(C_6H_5)_3P$ in cyclohexane, 7.0 ml. of 1.0 M $TiCl_4$ in cyclohexane, 41.8 ml. of 0.2 M $LiAl(C_{10}H_{21})_2H_2$ (in tetralin, prepared with an excess of $LiAlH_4$ reactant to the 1-decene reactant) in about 600 ml. of cyclohexane. Polymerization of C.P. propylene at ambient room conditions for a period of four hours and work-up of the product yielded 38.3 grams of dry polymer. The product was about 25% crystalline of which about 70% was due to syndiotactic crystallinity (X-ray diffractogram derived $F_s - 0.186 = 0.573$). The molecular weight was 1,760,000 and the polymer exhibited a weak infrared absorption band at 11.53 $\mu$.

In like manner, a catalyst prepared by adding in succession 209 mls. of 0.2 M $LiAl(C_{10}H_{21})_2H_2$ in tetralin, 3.84 mls. (6.63 grams, 0.0349 mole) of pure $TiCl_4$ and 175 ml. of 0.2 M triphenyl phosphine to 3000 mls. of spectroscopic grade cyclohexane was reacted with gaseous C.P. propylene at ambient temperature and pressure for 40 hours. A yield of 302 grams of dry polymer was obtained. The product was found to be about 30% crystalline, about 68% of the crystallinity being due to syndiotactic crystallinity (X-ray diffractogram derived $F_s - 0.186 = 0.555$).

In another run the influence of propylene pressure on the polymerization reaction was studied. In a thoroughly flushed (nitrogen) 2000 ml. capacity stirred Parr autoclave equipped with an internal cooling coil, a coordination catalyst was prepared by adding in succession 41.8 mls. of 0.2 M $LiAl(C_{10}H_{21})_2H_2$ in tetralin, and 7.0 mls. of 1.0 M $TiCl_4$ (in cyclohexane) and 35 mls. of 0.2 M triphenyl phosphine (in cyclohexane) to 600 mls. of spectroscopic pure cyclohexane. The system was pressured with 135 ± 10 p.s.i.g. of C.P. propylene, this pressure was maintained and the reaction was carried out with stirring at 28 ± 3° C. for 2.5 hours under this pressure. A yield of 178 grams of dry polymer was obtained after work-up. The polymer was about 31% crystalline, about 66% of the crystallinity being due to syndiotactic crystallinity (X-ray diffractogram derived $F_s - 0.186 = 0.506$).

*Example III*

A three-necked 12 liter capacity flask was fitted with a stirrer, a self-sealing rubber serum ampoule cap, inlets for gaseous nitrogen and propylene and for liquids, and an exit bubbler. The flask was externally cooled by means of a water-cooled bath. Using vacuum and pure nitrogen atmosphere transfer techniques, into a reaction flask were placed 6.0 liters of dry cyclohexane, 418 mls. of 0.171 M $LiAl(C_{10}H_{21})_{2.6}H_{1.4}$ in tetralin, 7.68 ml. of pure $TiCl_4$, and 350 ml. of 0.20 M $(C_6H_5)_3P$ in cyclohexane, with mixing under a pure nitrogen atmosphere. Contact with gaseous propylene was then established under room conditions for a total of about 18 hours. Work-up of the product led to the isolation of 378 grams of dry polymer (about 5410 grams of polymer per mole of titanium), roughly 60% of the material being insoluble in hot isooctane. The hot isooctane insoluble fraction displayed an X-ray crystallinity of about 43 percent and an X-ray diffractogram derived $F_s - 0.186 = 0.685$, corresponding to about 84% of the total crystallinity existing as syndiotactic crystallinity.

Another run was made in a 12 gallon capacity, stirred, pressure stainless steel reaction vessel. Into the reaction vessel were placed 5 gallons of cyclohexane, 980 ml. of 0.174 M $LiAl(C_{10}H_{21})_{2.8}H_{1.2}$ in tetralin, 15 mls. of pure $TiCl_4$, and 700 mls. of 0.20 M $(C_6H_5)_3P$ in cyclohexane with stirring, at room temperature, and was continued for 2.5 hours. A total yield of 948 grams of crude polymer was obtained and of this 579 grams were insoluble in hot isooctane. The hot isooctane insoluble material displayed an X-ray crystallinity of about 35% and an X-ray diffractogram derived $F_s - 0.186 = 0.617$, corresponding to about 76% syndiotactic crystallinity.

*Example IV*

Another experiment was carried out using a lithium aluminum nonyl hydride-titanium tetrachloride-triphenyl phosphine catalyst. A mixture of 700 ml. of purified tetralin, 150 ml. (111 grams) of 1-nonene, 21 grams of freshly crushed white lithium aluminum hydride, and 25 grams of glass beads were reacted with stirring under nitrogen near reflux temperature (about 180–190° C.) for a total of 2.5 hours, some decomposition of the excess lithium aluminum hydride being evidenced from the deposition of an aluminum metal mirror on the inside of the reaction flask. The gray product was then cooled to about 110–130° C. and filtered while warm through an oven dried (130° C.) celite filter pad supported on a sintered glass filter, the clear filtrate being collected by vacua and then stored under nitrogen.

Titration of the lithium content of aliquots of the filtrate with standard hydrochloric acid indicated it to be 0.189 molar in lithium aluminum compound. Aliquots (5.0 ml.) of the filtrate when then added to isopropanol under a gas collecting tube liberated an average amount of hydrogen (36.8 ml. of dry $H_2$ at S.T.P., corresponding to 0.00164 mole of $H_2$ or 0.00164 gram atoms of hydrogen in 0.000945 mole of the lithium aluminum nonyl hydride) which indicated the formula to be $$LiAl(C_9H_{19})_{2.26}H_{1.74}$$

A five liter capacity, three-necked flask was fitted with mechanical stirrer, water-cooled reflux condenser, and was provided with a self-sealing serum ampoule cap and means for admitting gaseous pure nitrogen and C.P. propylene, provision being made for external cooling by means of a compressed air jet. Into the reaction vessel was then added 3,000 ml. of dry cyclohexane. The contents of the flask were thoroughly flushed with pure nitrogen and then in succession 3.8 ml. (6.56 grams) of pure titanium tetrachloride, 220 ml. of the above 0.189 molar lithium aluminum nonyl hydride and 70 ml. of 0.50 molar triphenyl phosphine in toluene were added. After stirring at room temperature for about 10 minutes, a rapid stream of gaseous propylene was passed into the flask, with stirring, such contact with propylene being maintained at room temperature for a total period of 20 hours. Workup of the product with a 40:1 by volume mixture of isopropanol:concentrated hydrochloric acid and drying yielded 109 grams of dry polymer. The polymer exhibited an X-ray crystallinity of about 31% of which about 79% of the total crystallinity was due to syndiotactic crystallinity (X-ray diffractogram derived $F_s$—0.186 =0.642).

We claim:
1. The process for preparing highly syndiotactic, crystalline polymers of alpha-olefins comprising polymerizing an alpha-olefin selected from the group consisting of propylene and butene-1 in the presence of a catalyst having the components
   (A) a lithium aluminum alkyl hydride of the formula $LiAl(R)_x(H)_y$ wherein R is an alkyl group having from 1 to 20 carbon atoms, $x$ and $y$ are numbers greater than zero and the sum of $x+y$ is always 4 and
   (B) a compound having the formula $MX_4$ wherein M is a member selected from the group consisting of titanium and vanadium and X is a member of the group consisting of chlorine, bromine and iodine and
   (C) a compound having the formula $AR'_3$ wherein A is a member of the group consisting of phosphorous, arsenic and antimony and R' is a hydrocarbon radical having from 1 to 18 carbon atoms
wherein the molar ratio of components A:B is from 0.6 to 4 and components C:B is 0.2 to 2.0 in a hydrocarbon solvent at a temperature of from —40 to +60° C. in the substantial absence of oxygen and moisture.

2. The process of claim 1 wherein M is titanium, X is chlorine and A is phosphorous.

3. The process of claim 2 wherein the partial pressure of the alpha-olefin is from 0.001 to 30 atmospheres.

4. The process of claim 3 wherein the alpha-olefin is propylene.

5. The process of claim 4 wherein the hydrocarbon solvent is cyclohexane.

6. The process of claim 4 wherein the hydrocarbon solvent is toluene.

References Cited by the Examiner

UNITED STATES PATENTS

| | | | |
|---|---|---|---|
| 2,981,726 | 4/1961 | Gordon | 260—93.7 |
| 3,058,969 | 10/1962 | Coover et al. | 260—93.7 |

FOREIGN PATENTS

| | | |
|---|---|---|
| 1,231,090 | 9/1960 | France. |

JOSEPH L. SCHOFER, *Primary Examiner.*

M. B. KURTZMAN, *Assistant Examiner.*

UNITED STATES PATENT OFFICE
CERTIFICATE OF CORRECTION

Patent No. 3,278,512

October 11, 1966

Donald D. Emrick et al.

It is hereby certified that error appears in the above numbered patent requiring correction and that the said Letters Patent should read as corrected below.

Column 1, line 13, for "syndiotactive" read -- syndiotactic --; column 2, line 6, for "$TiCl_4 LiAl(C_{10}H_{21})_4$" read -- $TiCl_4-LiAl(C_{10}H_{21})_4$ --; line 33, for "poly-alpha-olens" read -- poly-alpha-olefins --; column 4, lines 64 and 65, the formula should appear as shown below instead of as in the patent:

$$\frac{2.15 I_{d=7.3A.} + 5.18 I_{d=5.3A.}}{2.15 I_{d=7.3A.} + 3.06 I_{d=6.3A.} + 5.18 I_{d=5.3A.} + 6.98 I_{d=4.8A.}}$$

column 5, line 4, strike out "$F_s-0.186=0.84$ '100% syndiotatic polymer'"; same column 5, lines 7 and 8, the formula should appear as shown below instead of as in the patent:

$$\frac{2.15 I_{d=7.3A.} + 5.18 I_{d=5.3A.}}{2.15 I_{d=7.3A.} + 3.06 I_{d=6.3A.} + 5.18 I_{d=5.3A.} + 6.98 I_{d=4.8A.}} \quad \frac{-0.186}{0.814} \times 100 =$$

column 5, line 11, strike out "0.186x100="; columns 5 and 6, lines 29 and 30, in the numerator of the equation, for those portions reading "d=7.3", "d=4.8" and "d4 2A." read -- d=7.3A. --, -- d=4.8A. --, and -- d=4.2A. --, respectively; same lines 29 and 30, in the denominator of the equation, for that portion reading "+0.9(69)Am" read -- +0.9(6.9)Am --; column 5, line 67, for "24% crystalline and about 77%" read -- 30% crystalline, about 57% --; column 6, line 11, for "asmosphere" read -- atmosphere --; line 45, for "forgoing" read -- foregoing --; column 7, line 13, for "atmosphere," read -- atmosphere. --.

Signed and sealed this 5th day of September 1967.

(SEAL)
Attest:

ERNEST W. SWIDER
Attesting Officer

EDWARD J. BRENNER
Commissioner of Patents